United States Patent [19]

Sharp

[11] 4,021,518
[45] May 3, 1977

[54] METHOD OF FORMING AN ARTICLE INCLUDING REINFORCING ELEMENTS ENCAPSULATED IN THERMOPLASTIC MATERIAL

[75] Inventor: Herbert J. Sharp, Greenford, England

[73] Assignee: Bridgend Investments Limited, London, England

[22] Filed: Jan. 14, 1975

[21] Appl. No.: 540,768

[30] Foreign Application Priority Data

Jan. 14, 1974  United Kingdom .............. 1745/74

[52] U.S. Cl. ................................. 264/92; 264/274; 264/278; 425/388
[51] Int. Cl.² ...................... B29C 17/04; B29D 3/02
[58] Field of Search ................. 264/89, 90, 92, 93, 264/94, 274, 278; 425/504, 388

[56] References Cited
UNITED STATES PATENTS

| | | | |
|---|---|---|---|
| 2,361,348 | 10/1944 | Dickson et al. | 264/278 |
| 3,238,287 | 3/1966 | Chapman | 264/278 X |
| 3,875,280 | 4/1975 | Story | 264/92 |

*Primary Examiner*—Jan H. Silbaugh
*Attorney, Agent, or Firm*—Sughrue, Rothwell, Mion, Zinn & Macpeak

[57] ABSTRACT

A method of forming a two-dimensional array of reinforcement elements completely encapsulated in a thermoplastic material. The reinforcement array is supported above a vacuum forming table on a plurality of pegs moveable upwards from the surface of the table, a sheet of hot thermoplastic material is positioned over the reinforcement array and a vacuum is applied through the table to draw the thermoplastic material down and around underneath the reinforcement. The pegs are then retracted to a position substantially flush with the surface of the table once the thermoplastic material is capable of supporting the reinforcement, the vacuum then drawing the thermoplastic material around and underneath the reinforcement and to those parts of the reinforcement above the pegs. The thermoplastic material is then allowed to cool and set.

2 Claims, 5 Drawing Figures

METHOD OF FORMING AN ARTICLE INCLUDING REINFORCING ELEMENTS ENCAPSULATED IN THERMOPLASTIC MATERIAL

The invention relates to vacuum moulding and more particularly to the encapsulation of reinforcement bars or grids by vacuum forming a thermoplastic sheet around the reinforcement.

It is known to form a pallet by supporting elongate steel reinforcements on pegs on a vacuum forming table, and superimposing a hot sheet of thermoplastic material so that the vacuum draws the hot sheet both around and under the reinforcement, the parts of the hot sheet drawn together under the reinforcement being thus fused together to encapsulate the reinforcement. However, encapsulation is not complete because the supporting pegs prevent the hot thermoplastic material being drawn underneath the steel reinforcement at the points where the reinforcement is supported.

In order to overcome this problem, and in accordance with the present invention, the pegs which support the reinforcement above the vacuum forming table are retractable into the table.

In use, the pegs are retracted soon after the vacuum has been created and when sufficient thermoplastic material has filled the gap between the underside of the reinforcement and the top of the forming table for the plastics material to take over the supporting function for the reinforcement. This results in total encapsulation of the reinforcement and enables, for example, the manufacture of a pallet having a smooth deck of plastics material uninterrupted by areas where steel reinforcement is exposed.

The invention also includes a vacuum forming table which incorporates a plurality of pegs for supporting a reinforcement above the vacuum forming table, the pegs being moveable in a direction perpendicular to the plane of the table and retractable into a position in which they are flush with the surface of the table.

One example of the use and construction of a vacuum forming table according to invention will now be described with reference to the accompanying diagrammatic drawings, in which.

Figure 1:
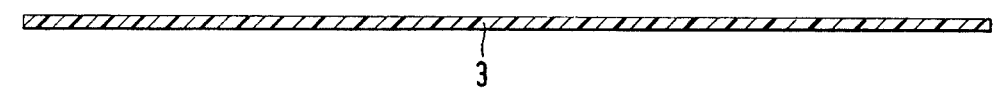
FIG. 1 is a vertical section through a vacuum forming table showing reinforcement resting thereon and a hot sheet of thermoplastic material superposed over the reinforcement.
Figure 1:
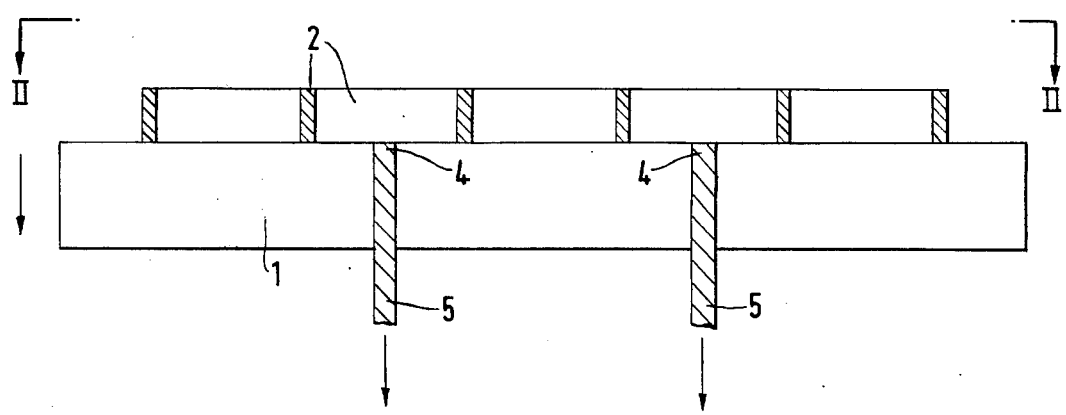

In FIG. 1 there is shown a vacuum forming table 1 on which rests rectangular-sectioned mild steel reinforcement 2 which is to be encapsulated by a thermoplastic sheet of material 3 to form a pallet. The vacuum forming table includes four supporting pegs 4 which are moveable relatively to the table in a perpendicular direction by means of rods 5 with which the pegs 4 are integral, the rods 5 being raisable by jacks (not shown). Whilst only four pegs are shown in the drawings the vacuum forming table may include a larger number if the reinforcement is such as to require further support.

Figure 3:
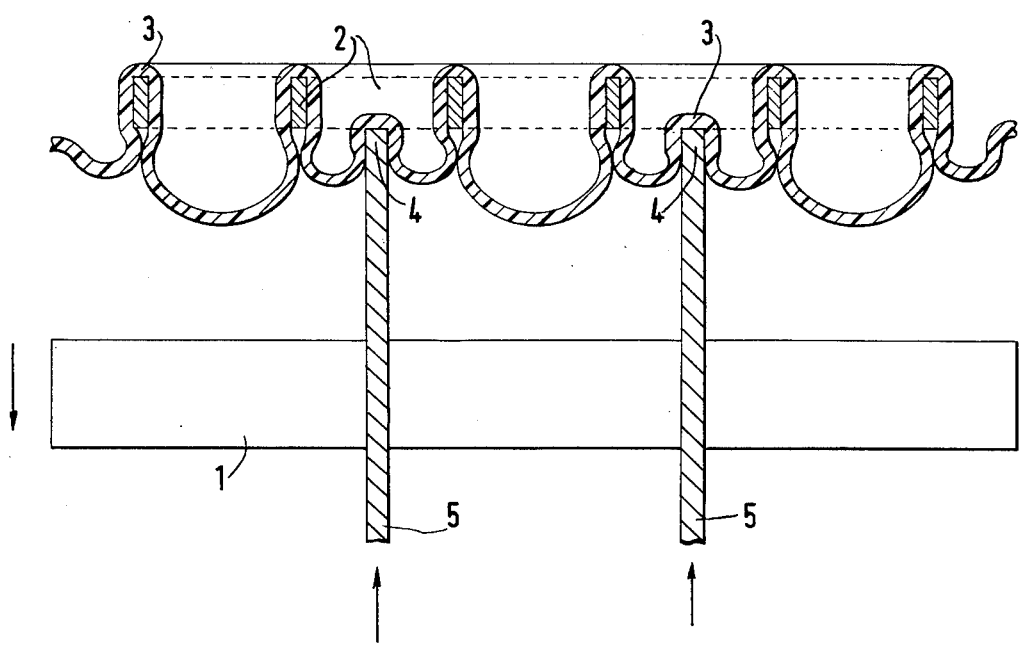
Figure 2:
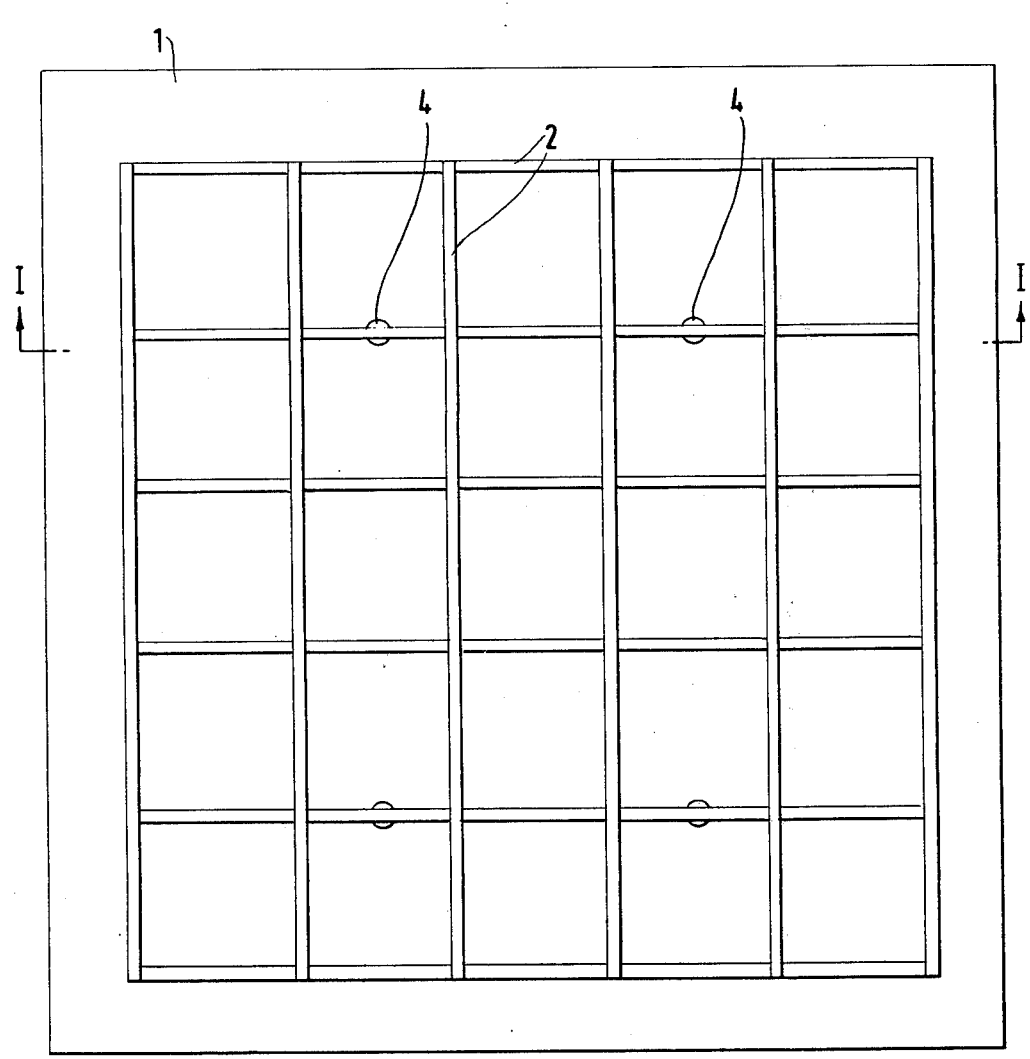
FIG. 2 is a plan view of the apparatus shown in FIG. 1, along the line II—II in FIG. 1; and, FIGS. 3, 4 and 5 are similar views to FIG. 1 showing first, second and third stages of the process respectively.

To initiate the encapsulation process the pegs 4 are raised as shown in FIG. 3 until the reinforcement elements 2 abut the underneath of the thermoplastics sheet 3. A vacuum is then applied through the vacuum forming table 1 to draw the thermoplastic sheet 3 down and around the reinforcement members 2. In order to make forming of the thermoplastic sheet possible it is preheated before being positioned over the reinforcement members on the vacuum forming table. As can be seen in FIG. 3 loops of the hot thermoplastic material are formed below the reinforcement 2 and in order that the thermoplastic material can be formed into a flat surface to form the top of a pallet the pegs 4 are lowered to the position shown in FIG. 4 so that the thermoplastics material 3 moulds itself against the planar surface of the vacuum forming table.

Figure 4:
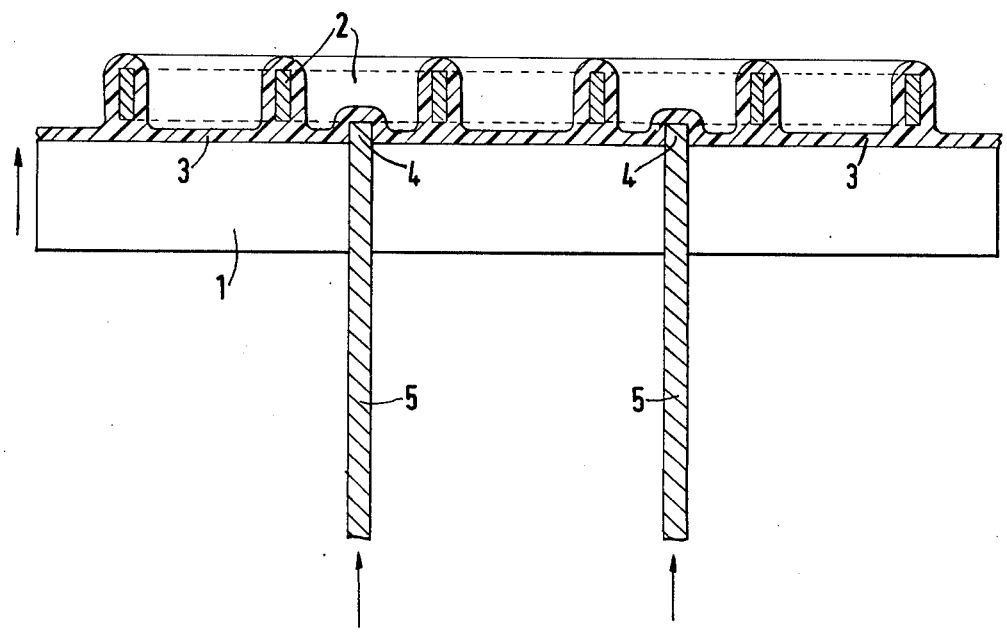
Figure 5:
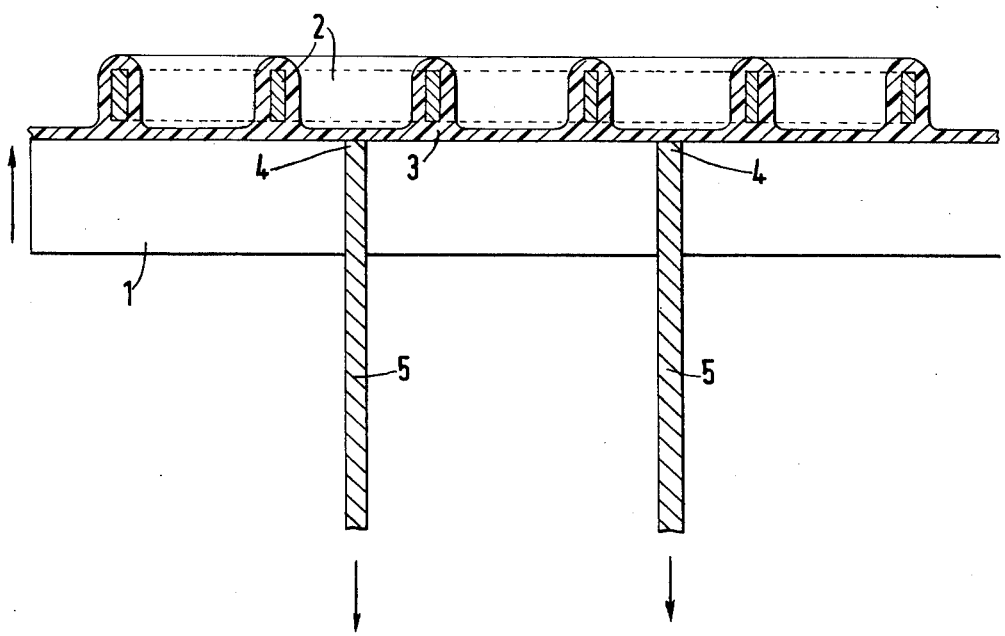

However for a short length of time, the thermoplastics material 3 is unable to support the weight of the reinforcement and so the pegs are retained in the position as shown in FIG. 4 until such time as the reinforcement can be at least partially supported by the thermoplastics material. The pegs are then withdrawn into their recesses 6 so that the tops of the pegs lie flush with the vacuum forming table surface. The continued application of the vacuum through the vacuum forming table draws the final portions of the thermoplastics material down onto the vacuum forming table surface to complete the encapsulation process. Depending on the time at which the pegs are withdrawn, the reinforcement will sink to a greater or lesser extent into the thermoplastic material.

I claim:

1. A method of forming a substantially two-dimensional array of reinforcing elements completely encapsulated in a thermoplastic material, comprising the steps of:
   a. supporting an array of reinforcing elements above a vacuum forming table on movable support means extending upwardly with respect to the remainder of the table,
   b. positioning a sheet of hot thermoplastic material over said array,
   c. applying a vacuum through said table to draw the sheet down around and underneath said reinforcing elements,
   d. lowering said reinforcing elements by retracting the support means to a position at which the thermoplastic material contacts the table and is at least partially supported thereby,
   e. continuing the retraction of the support means to a position substantially flush with the plane of the table after the thermoplastic material is capable of supporting the reinforcing elements above the table, and
   f. continuing to apply a vacuum to draw the sheet around and underneath the reinforcing elements at the locations thereon above the support means.

2. A method as defined in claim 1 wherein the support means comprises a plurality of pegs perpendicularly movable with respect to the remainder of the table.

* * * * *